US006666467B2

(12) United States Patent
Bernhardt

(10) Patent No.: US 6,666,467 B2
(45) Date of Patent: Dec. 23, 2003

(54) JOINT ROD FOR A MOTOR VEHICLE

(75) Inventor: Peter Bernhardt, Wuppertal (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/877,971

(22) Filed: Jun. 8, 2001

(65) Prior Publication Data

US 2001/0050469 A1 Dec. 13, 2001

(30) Foreign Application Priority Data

Jun. 9, 2000 (DE) ..................... 200 10 341 U

(51) Int. Cl.⁷ ................................. B62D 7/20
(52) U.S. Cl. .................................. 280/93.51
(58) Field of Search .................. 280/93.51, 93.511; 403/90; 74/579 R, 593

(56) References Cited

U.S. PATENT DOCUMENTS 5,813,264 A * 9/1998 Steingroever .................. 72/56

FOREIGN PATENT DOCUMENTS

| DE | 19602951 | 7/2000 | | |
| JP | 59073364 A | * 4/1984 | ............ | B62D/7/20 |

OTHER PUBLICATIONS

JP 59–73364 Patent Abstracts of Japan, M–319, Aug. 22, 1984, vol. 8, No. 182.
Hentschel, Peter, Wahl, Georg: Das Fahrwerk des Porsche Boxter. In; Sonderausgabe ATZ und MTZ, Nov. 1996, pp. 34–41.
Junker Heinz: Evolution in der Lenkungstechnologie. In: Automobil–Industrie , Jan. 1992 pp. 17–22.

* cited by examiner

Primary Examiner—Paul N. Dickson
Assistant Examiner—Faye M. Fleming
(74) Attorney, Agent, or Firm—Tarolli, Sundheim, Covell & Tummino L.L.P.

(57) ABSTRACT

A joint rod adapted for motor vehicles consists of a joint section having a connecting surface and a rod section having an inner surface. The joint section and the rod section being joined by positive engagement between the connecting surface and the inner surface. The rod section is made from a first material and the joint section is made from a second material, the first material and the second material being different from each other.

5 Claims, 2 Drawing Sheets

JOINT ROD FOR A MOTOR VEHICLE

The invention relates to a joint rod for a motor vehicle.

BACKGROUND OF THE INVENTION

A typical joint rod comprises two joint, in particular ball stud joints, and a rod section connecting the joints. Such joint rods are used e.g. in the chassis of a motor vehicle as steering tie rods. During the driving operation, these steering tie rods are exposed to high loads and therefore have to have great rigidity. On the other hand, in vehicle manufacture there is the general demand for reducing the weight both under the aspect of saving energy and, in particular in the area of the chassis, to increase the driving comfort. Joint rods used so far usually consist of a rod section made of steel and a joint section which is mounted thereon e.g. by friction welding and comprises a turned joint socket and a ball pin, both also made of steel. The ball pin and the joint socket cannot be joined until they have been mounted by welding in order not to impair the function of the joint by the welding process.

Furthermore, it is known to make joint rods of plastic material, the rod section and the joint socket being injection-molded in one piece and then the ball pin being inserted. A certain weight reduction can be obtained with these plastic joint rods vis-a-vis the steel type, although the rod section must be realized in rather solid fashion in its middle region to achieve the required rigidity. However, the it is extremely disadvantageous in connection with these joint rods that for the production of a joint rod having another length a new tool has to be produced, e.g. for another vehicle type or in case the design of the chassis is modified.

Another drawback existing in connection with both the steel and the plastic versions consists in that the joint rod has to be handled in its entire length when the ball end is inserted, an adaptation of the handling tools being again required for joint rods of different length.

Therefore, it is the object of this invention to create a joint rod which offers weight saving over the formerly used ones and can be produced in a simple and cost-effective manner, in particular with respect to a series production of similar items with differing length.

BRIEF DESCRIPTION OF THE INVENTION

To this end, the invention provides a joint rod adapted for motor vehicles, which consists of a joint section having a connecting surface and a rod section having an inner surface. The joint section and the rod section being joined by positive engagement between the connecting surface and the inner surface. The rod section is made from a first material and the joint section is made from a second material, the first material and the second material being different from each other. In this way, the same joint sections can be used for joint rods of differing length, which can therefore be produced in greater numbers and thus in more cost-effective manner. The production of a positive engagement does not impair the function of the joint section, so that it can be combined from the joint socket and ball pin already before being connected with the rod section. In this connection, only the joint section has to be handled which is substantially smaller than the entire joint rod and furthermore can be uniform for joint rods having differing lengths. A commercial semi-finished product can be used for the rod section in cost-effective manner, which product is cut into lengths for the joint rod to be produced in accordance with the desired dimensions. Materials which have exactly the properties called for in the respective section can be used for joint section and rod section.

According to the preferred embodiment of the invention the rod section consists of an electrically well conductive material and the joint section is made of a fiber-reinforced plastic material. Therefore, the joint section can be produced very simply and in cost-effective manner by means of injection molding and can reliably be joined in simple manner by magnetic deformation of the rod section so that the inner surface of the rod section positively engages the connecting surface of the joint.

Further embodiments of the invention and their advantages follow from the subclaims.

BRIEF DESCRIPTION OF THE INVENTION

The invention is described below by means of a preferred embodiment which is shown in the appended drawings, in which.

DETAILED DESCRIPTION OF THE INVENTION

Figure 1:
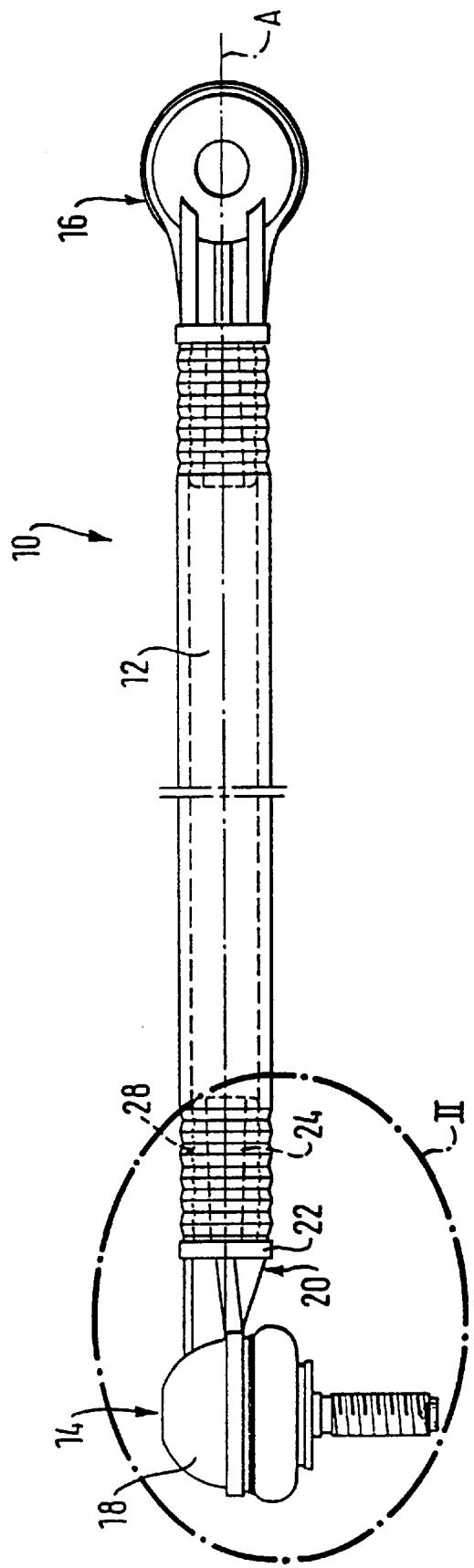
FIG. 1 shows a view of a joint rod according to the invention.
Figure 2:
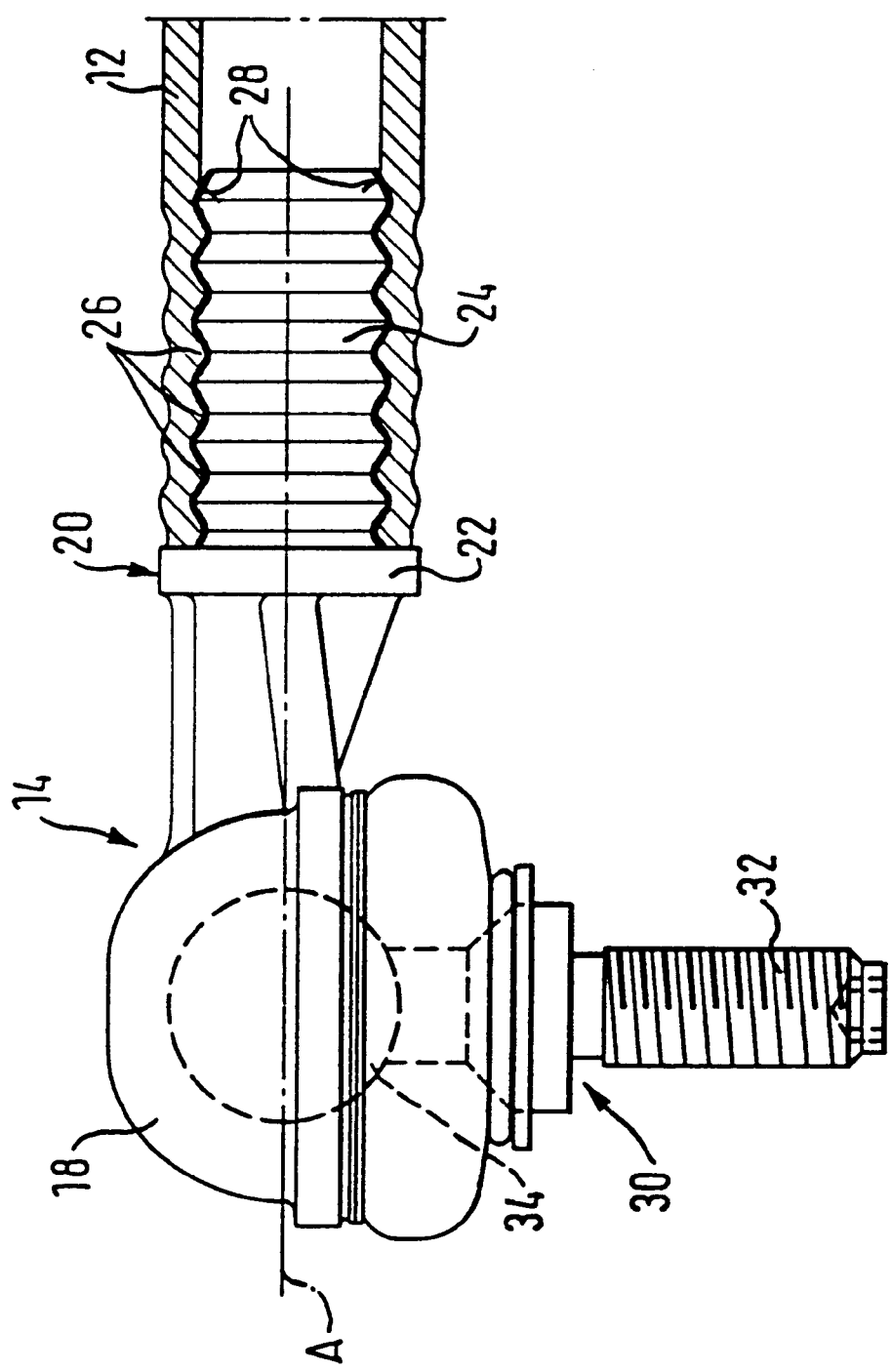
FIG. 2 shows a partially cut, enlarged view of detail II of FIG. 1.

The joint rod 10 shown in FIG. 1 comprises a rod section 12 and two joint sections 14 and 16. The two joint sections 14 and 16 are substantially equal but they are joined with the rod section 12 such that they are turned in opposite directions by 90° about the longitudinal axis A of rod section 12. However, the joint sections can fundamentally be arranged at any angle. The joint section 14, which is shown in more detail in FIG. 2, consists of a joint socket 18 having a radially protruding shaft 20. Both parts are advantageously injected-molded in one piece of fiber-reinforced plastic material, e.g. POM. The shaft 20 is provided with a flange 22 on which a substantially cylindrical connection piece 24 borders. The circumferential surface of the connection piece 24 forms a connecting surface having radially surrounding recesses 26, so that adjacent sections of differing circumference or differing diameter are formed in axial direction. A ball pin 30 is inserted in the joint socket 18, which pin has a screwed shank 32 at one end and a ball end 34 at the other end, with which it pivotally slides in the joint socket about the center of the ball pin. The formation of the joint is only shown by way of example and the person skilled in the art is also familiar therewith so that it need not be further described here. Of course, any kind of joint suitable for a joint rod can be used.

The rod section 12 is realized by a straight cylindrical aluminum tube This tube which has equal rigidity saves considerable weight over a steel rod. As compared to a conventional joint rod made of steel and having a joint section attached by welding, a weight reduction of up to 50% is possible. At each of its axial ends, the rod section has an inner surface 28 adapted to be connected to the joint section The internal diameter of the inner surface 28 of the aluminum tube 12 is dimensioned such that it can be pushed easily or with minor pressure onto the connection piece 24 of the joint section 14 or 16 up to the stop at the flange 22. In the area of the inner surface 28, the tube 12 is deformed such that it positively engages the connecting surface by protruding into those sections of the connecting surface having a smaller diameter than adjacent sections. The connecting surface is preferably formed wave-shaped. As a result, when deformed the tube 12 can well adapt to this contour so that a large contact surface and thus via the friction also a great power transmission can be achieved between joint section and rod section in the case of a rotary motion about axis A.

The deformation of the aluminum tube 12 in the region of the inner surface 28 can be achieved in an especially advantageous manner by the magnetic field of a current pulse in a peak current loop as described in DE 196 02 951 A1, for example. In contrast to the conventional pressing operation, a reliable and firm positive engagement can be established in this way by a contact-less deformation with largely any shape of the connection piece 24, without a specifically adapted pressing tool being required for this purpose.

The invention provides a joint rod which has a high mechanical strength in the area of the rod section, saves considerable weight and offers a wide creative scope for the joint section, the greatest possible functional flexibility with respect to the use of standard products being ensured at the same time.

What is claimed is:

1. A joint rod adapted for motor vehicles, comprising a joint section having a connecting surface and a rod section having an inner surface, said joint section and said rod section being joined by positive engagement between said connecting surface and said inner surface, said rod section being made from a first material and said joint section being made from a second material, said first material and said second material being different from each other, said first material being selected from the group consisting of aluminum and aluminum alloys and said second material being a plastic material.

2. The joint rod of claim 1, wherein said rod section consists of a straight cylindrical tube.

3. The joint rod of claim 1, wherein said first material is electrically well conductive.

4. The joint rod of claim 1, wherein said rod section comprises a magnetically deformed portion.

5. The joint rod of claim 1, wherein said connecting surface is substantially cylindrical and has sections which are adjacent to each other, said sections having different diameters.

* * * * *